E. W. DAVIS.
DISSOLVING APPARATUS.
APPLICATION FILED JUNE 14, 1917.

1,275,863.

Patented Aug. 13, 1918.
2 SHEETS—SHEET 1.

Witnesses

Inventor
Ernest W. Davis
By Burton & Hills
Atty.

E. W. DAVIS.
DISSOLVING APPARATUS.
APPLICATION FILED JUNE 14, 1917.

1,275,863.

Patented Aug. 13, 1918.
2 SHEETS—SHEET 2.

Witnesses:
Robert H Weir
Arthur W. Carlson

Inventor
Ernest W. Davis
By Burton & Hille
Attys

UNITED STATES PATENT OFFICE.

ERNEST W. DAVIS, OF CHICAGO, ILLINOIS, ASSIGNOR TO UNIVERSAL CAMERA COMPANY, OF CHICAGO, ILLINOIS, A CORPORATION OF ILLINOIS.

DISSOLVING APPARATUS.

1,275,863.  Specification of Letters Patent.  Patented Aug. 13, 1918.

Application filed June 14, 1917. Serial No. 174,692.

*To all whom it may concern:*

Be it known that I, ERNEST W. DAVIS, a citizen of the United States, residing at Chicago, in the county of Cook, and State of Illinois, have invented certain new and useful Improvements in Dissolving Apparatus, of which the following is a description.

My invention relates to that portion of a motion picture camera or the like, known as a dissolve or fade whereby the brilliancy of a series of views is successively increased or decreased depending upon the result desired. Thus in a series of views the brilliancy may be gradually reduced until they completely disappear or they may commence with a blank and the brilliancy be gradually increased until they attain the full normal.

The object of my invention is to provide a simple, reliable, accurate and altogether dependable device of the kind described which may be employed with any camera and which requires no attention whatever in the construction of the camera or changes in, or connections to, the usual mechanism of the camera.

To this end my invention consists in the novel construction, arrangement and combination of parts herein shown and described and more particularly pointed out in the claims.

In the accompanying drawings wherein like or similar reference characters indicate like or corresponding parts:

Figure 1:
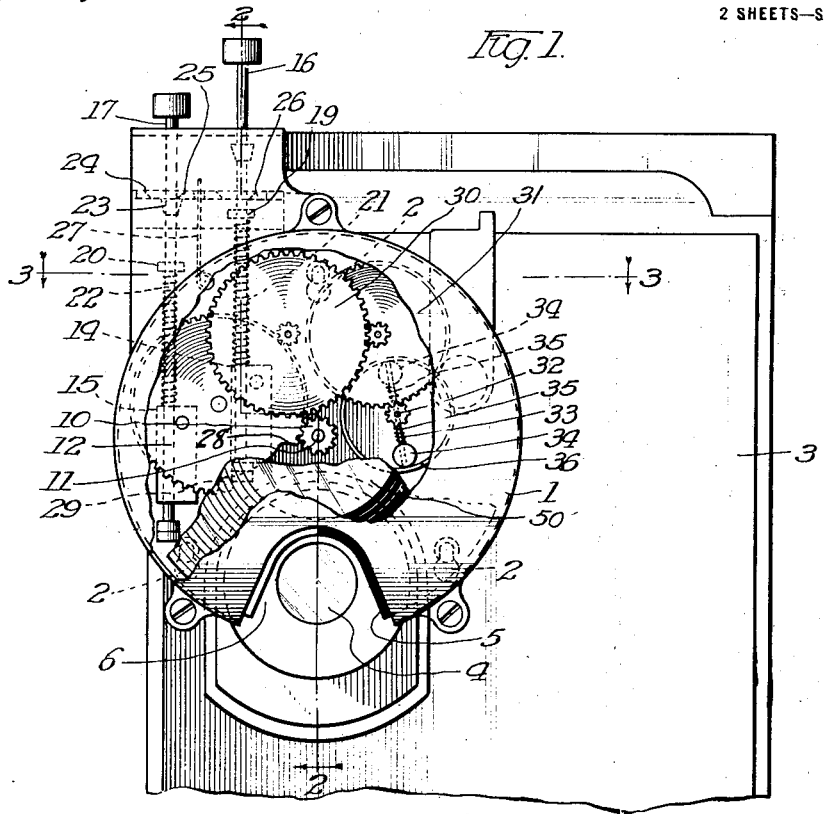
Figure 1 is a front elevation of my device in position upon a camera.
Figure 2:
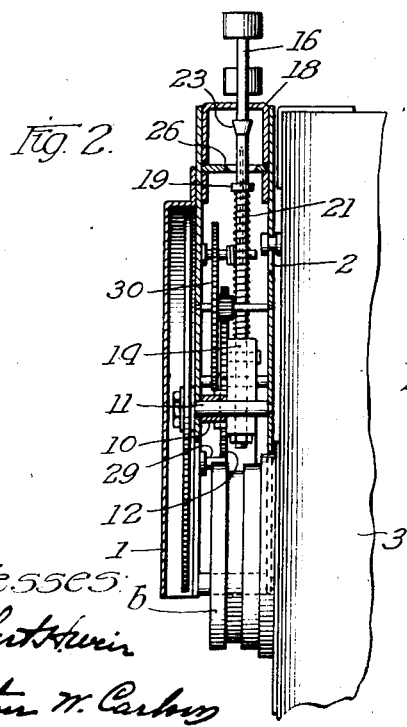
Fig. 2 is a section taken substantially on line 2—2 of Fig. 1.
Figure 3:
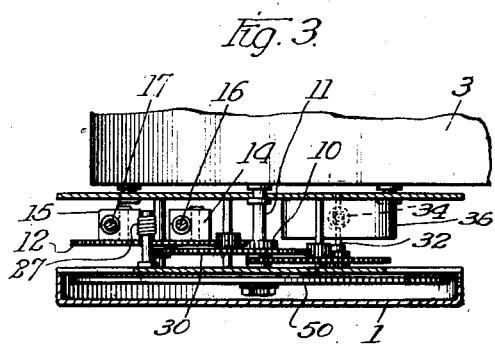
Fig. 3 is a section taken substantially on line 3—3 of Fig. 1.

In the form shown in the drawings my improvement comprises a suitably formed frame or housing 1 provided with means as at 2—2—2 for rigidly attaching the same to the face or front of a camera 3 in close proximity to the aperture 4 through which the light passes to the interior of the camera. A suitably formed screen 5 is mounted upon the frame 1 and arranged to move transversely before, or in any desired relation to the aperture 4 so as to intercept the light passing into the camera when in operation. In the form shown the screen 5 comprises a disk 50 preferably formed of glass or other transparent material having the operative portion of the screen formed near its periphery so that as the disk rotates the screen will be moved transversely across the aperture 4.

Figure 5:
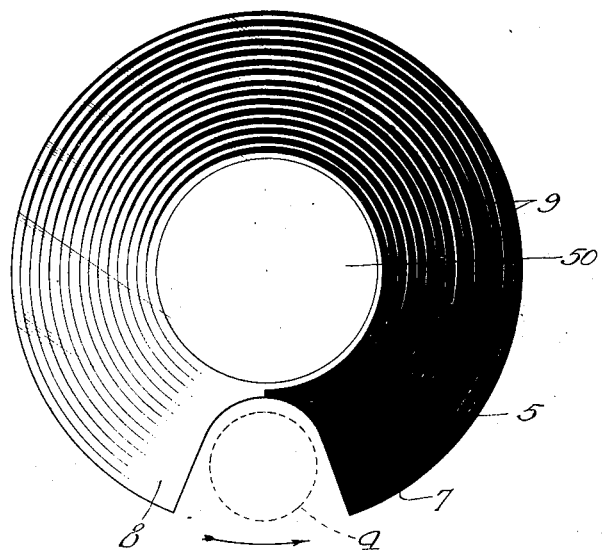
Fig. 5 is a similar view of a slightly modified form of screen.
Figure 4:
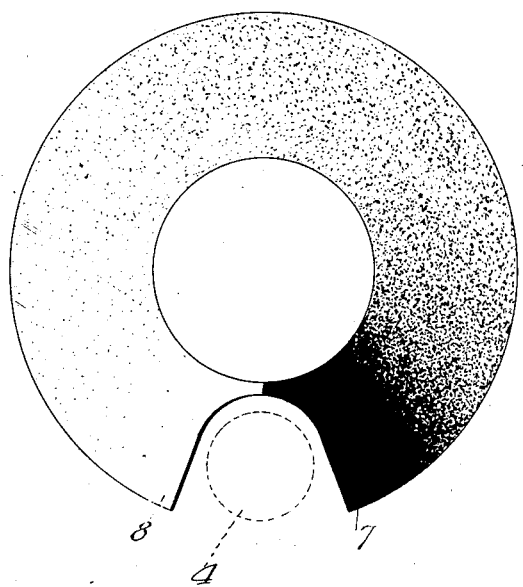
Fig. 4 is an elevation of a screen for my device.

In the preferred construction a notch or recess 6 is formed at the periphery of the disk 50 either by cutting away the material of which the disk is formed or providing an absolutely clear space upon the disk of suitable size to entirely clear the aperture 4 when the disk is in its normal position as shown in Fig. 1. The screen extends around the disk terminating at the respective sides of the recess 6. In the preferred construction the screen is substantially opaque at one end as at 7 in Figs. 4 and 5 for a space approximating the width of the aperture 4 and from this point gradually increases in transparency throughout its length until it is substantially clear at the end 8 so that with the screen mounted as shown in Fig. 1 and rotated in the direction shown in Fig. 4 the amount of light intercepted by the screen will gradually increase until it is entirely intercepted by the opaque portion at 7, and when used in connection with a motion picture camera the series of pictures taken while the screen is moving as described will gradually decrease in brilliancy until they are entirely obliterated or if the screen is moved in the opposite direction commencing with the opaque portion intercepting the light at the aperture the pictures will gradually increase in brilliancy until they reach their full normal when the screen is in the position shown in Fig. 1.

Any suitable means may be employed for producing the regularly increasing transparency of the screen 5. In the form shown in Fig. 4 commencing with the part 7 which is preferably solid opaque a series of dots are formed upon the disk 50 somewhat similar to the dots upon a half-tone, gradually decreasing in size or number toward the transparent portion of the screen and completely vanishing at the margin of the notch 6. While in the form shown in Fig. 5 a series of concentric lines 9 are formed upon the disk each commencing at the opaque portion 7 where their width is sufficient to jointly cover the entire width of the screen and gradually diminishing in width toward the transparent portion completely vanishing near the margin of the notch 6. Obviously substantially the same result may be obtained by employing a uniform coating of suitable material which gradually decreases in thickness from the opaque portion toward the transparent end of the screen.

Any suitable means may be provided for controlling the movements of the screen. As shown a pinion 10 is rigidly mounted upon the central axis of the screen and rigidly secured to the disk 5 in any suitable manner. A gear 12 is also rotatably mounted upon the frame 1 and arranged to mesh with the pinion 10. Suitable sleeves 14 and 15 are pivotally mounted on the face of the gear 12 each provided with an opening extending longitudinally therethrough. Stems 16 and 17 are provided each extending through the part 18 of the frame through the respective openings in the sleeves 14 and 15. The stems 16 and 17 are each provided with a collar as at 19 and 20 and a spring 21 is provided upon the stem 16 extending between the collar 19, and sleeve 14. A similar spring 22 is provided upon the stem 17 extending between the collar 20 and sleeve 15 so that by depressing the stem 16 or moving the same longitudinally through the sleeve the spring 21 will be compressed and tend to rotate the gear 12 and disk 50 in one direction while by depressing the sleeve 17 the spring 22 will be compressed tending to rotate the gear 12 and disk 50 in the opposite direction. Any suitable means may be provided to maintain the stems 16 and 17 in their depressed position and to release one when the other is depressed. In the form shown a conical collar 23 is also provided on each of the stems rigidly secured in position with the tapering portion of the collar adjacent the sleeve attached to the gear 12. A slide 24 is mounted upon the frame 1 extending transversely of the stems and provided with a pair of lips or teeth 25 and 26 for the stems 16 and 17 respectively; each lip is adapted to engage the base of one of the collars 23 to lock the stem upon which the collar is mounted in its depressed position. A spring 27 or other suitable means is provided to resiliently maintain the slide 24 in engaging position. The several parts are so constructed and arranged that when a stem is depressed the conical collar upon the stem engages its particular tooth upon the slide 24 and moves the slide longitudinally sufficiently to release the conical collar upon the other stem thus permitting the escape of the other stem while a slightly further movement of the stem being depressed engages its conical collar with the tooth upon the slide and positively locks the same in its depressed position.

Any suitable means may be provided to automatically arrest the movement of the screen 5 when it arrives at the desired limits of its movement. In the form shown a recess as at 28 is formed in the gear 12 and a pin 29 is provided upon the frame 1 extending into the recess and adapted to engage the respective ends thereof to arrest the movement of the gear 12 when the screen arrives in the desired position when moving in either direction.

Suitable means are also provided to regulate the speed of movement of the screen 5. For this purpose a suitable train of gears 30—31 connects the gear 12 to a shaft 32 having a transverse arm 33 rigidly secured thereto and extending substantially an equal distance on each side thereof. A pair of equal weights 34—34 are slidably mounted upon the arm 33 one on each side of the shaft 32. A spring 35 is provided for each weight to prevent the weight falling toward the center of the shaft 32. The centrifugal force of the weights 34—34 varies directly with the square of their velocity, so that the friction of the weights against the ring 36, regulates the speed and produces an approximately constant rate of rotation.

In operation my device is attached to a camera as shown in Fig. 1 with the notch 6 at the aperture 4 and the camera is operated in the usual manner. When it is desired to produce a dissolve the stem 16 is depressed thereby releasing the stem 17 and causing the mechanism to slowly rotate the screen 5 before the aperture 4 until it reaches the limit of its movement in that direction when the screen is arrested with the opaque portion intercepting the light to the aperture and totally obscuring the view being photographed. When it is desired to introduce a view the stem 16 is depressed as above described to bring the opaque portion of the screen in position before the aperture 4. The camera is then started and the stem 17 depressed thus releasing the stem 16 and causing the screen to move slowly in the opposite direction gradually admitting more light through the aperture 4 until it arrives at the position shown in Fig. 1 when the normal amount of light is being admitted. In cameras already constructed it is of course more convenient to attach my improved dissolving apparatus to the form of the instrument as shown in the drawings and in such cases the screen 5 moves in front of the aperture 4. In building a camera however to be equipped with my improved dissolve it may be desirable to mount the same upon the interior of the case and in that event the screen may be positioned at any point between the lens and the shutter of the camera, hence where the expression "before the aperture" is employed in the specification or claims I desire to be understood as meaning in position to intercept light passing through the aperture to the sensitive surface within the camera.

Having thus described my improvement it is obvious that various immaterial modifications may be made in my device without departing from the spirit of my invention, hence I do not wish to be understood as limiting myself to the exact form or construction shown.

What I claim as new and desire to secure by Letters Patent is:

1. A dissolving apparatus comprising a screen of increasing transparency from one end to the other, means for supporting said screen to control the aperture of a camera means for moving said screen transversely relative to said aperture and means for arresting the movement of said screen at either limit of its movement.

2. A dissolving apparatus comprising a circular member having a screen at its periphery of increasing transparency from one end to the other, means for supporting said screen to control the aperture of a camera, means for moving said screen transversely relative to said aperture and means for arresting the movement of said screen at either limit of its movement.

3. A dissolving apparatus comprising a screen of regularly increasing transparency from one end to the other, means for supporting said screen to control the aperture of a camera, means for moving said screen transversely relative to said aperture and means for arresting the movement of said screen at either limit of its movement.

4. A dissolving apparatus comprising a screen of increasing transparency from one end to the other, means for supporting said screen to control the aperture of a camera, a rotatable member and resilient means for alternately rotating the same in opposite direction for moving said screen transversely relative to said aperture and means for arresting the movement of said screen at either limit of its movement.

5. A dissolving apparatus comprising a screen of increasing transparency from one end to the other, means for supporting said screen to control the aperture of a camera means for moving said screen at a substantially uniform speed transversely relative to said aperture and means for arresting the movement of said screen at either limit of its movement.

6. A dissolving apparatus comprising a screen of increasing transparency from one end to the other, means for supporting said screen to control the aperture of a camera, a rotatable member and a pair of opposed springs coöperating with said member adapted to rotate said member in opposite directions and manually operable means for compressing either of said springs and releasing the other for moving said screen transversely relative to said aperture and means for arresting the movement of said screen at either limit of its movement.

7. A dissolving apparatus comprising a screen of increasing transparency from one end to the other, means for supporting said screen to control the aperture of a camera, means for moving said screen transversely relative to said aperture in more than one direction in either direction and means for arresting the movement of said screen at either limit of its movement.

8. A dissolving apparatus comprising a circular member having a screen at its periphery of regularly increasing transparency from one end to the other, means for supporting said screen to control the aperture of a camera, means for moving said screen transversely relative to said aperture and means for arresting the movement of said screen at either limit of its movement.

9. A dissolving apparatus comprising a circular member having a screen at its periphery of regularly increasing transparency from one end to the other, means for supporting said screen to control the aperture of a camera, a rotatable member and resilient means for alternately rotating the same in opposite directions for moving said screen transversely relative to said aperture and means for arresting the movement of said screen at either limit of its movement.

10. A dissolving apparatus comprising a circular member having a screen at its periphery of regularly increasing transparency from one end to the other, means for supporting said screen to control the aperture of a camera, a rotatable member and resilient means for alternately rotating the same on opposite directions for moving said screen at a substantially uniform speed and means for arresting the movement of said screen at either limit of its movement.

11. A dissolving apparatus comprising a circular member having a screen at its periphery of regularly increasing transparency from one end to the other, means for supporting said screen to control the aperture of a camera, a rotatable member and resilient means for alternately rotating the same in opposite directions for moving said screen at a substantially uniform speed transversely relative to said aperture in either direction and means for arresting the movement of said screen at either limit of its movement.

In testimony whereof, I have hereunto signed my name in the presence of two subscribing witnesses.

ERNEST W. DAVIS.

Witnesses:
BLANCHE CHALMERS,
BURTON U. HILLS.